United States Patent [19]

Boyesen

[11] Patent Number: 4,463,824
[45] Date of Patent: Aug. 7, 1984

[54] DRIVE WHEEL SUSPENSION SYSTEM FOR MOTORCYCLE

[75] Inventor: Eyvind Boyesen, Kempton, Pa.

[73] Assignee: Performance Industries, Inc., Kempton, Pa.

[21] Appl. No.: 415,553

[22] Filed: Sep. 7, 1982

Related U.S. Application Data

[63] Continuation-in-part of Ser. No. 368,220, Apr. 14, 1982, Pat. No. 4,408,674.

[51] Int. Cl.³ .............................................. B62K 25/04
[52] U.S. Cl. .................................. 180/227; 180/231; 280/284
[58] Field of Search ............... 180/227, 231; 280/284, 280/285

[56] References Cited

U.S. PATENT DOCUMENTS

| | | | |
|---|---|---|---|
| 2,705,154 | 3/1955 | Torre | 280/284 |
| 3,917,313 | 11/1975 | Smith et al. | 280/284 |
| 4,058,181 | 11/1977 | Buell | 180/227 |
| 4,114,918 | 9/1978 | Lutz | 280/284 |
| 4,265,329 | 5/1981 | de Cortanze | 180/219 |
| 4,392,536 | 7/1983 | Iwai et al. | 180/227 |

FOREIGN PATENT DOCUMENTS

| | | | |
|---|---|---|---|
| 847109 | 8/1952 | Fed. Rep. of Germany | 280/285 |
| 846372 | 7/1981 | U.S.S.R. | 280/284 |

Primary Examiner—John A. Pekar
Attorney, Agent, or Firm—John T. Synnestvedt; Kenneth P. Synnestvedt

[57] ABSTRACT

The application discloses a parallelogram type of drive wheel suspension system for a motorcycle and employs only a single swing arm at each side of the drive wheel, with the swing arms being torsionally interconnected through the axle structure of the wheel. An adjustable torsion bar is also disclosed for shock absorption; and there is still further disclosed a chain slack take-up device comprising adjustable means for eccentrically shifting the position of a swing arm pivot axis between different fixed positions.

13 Claims, 7 Drawing Figures

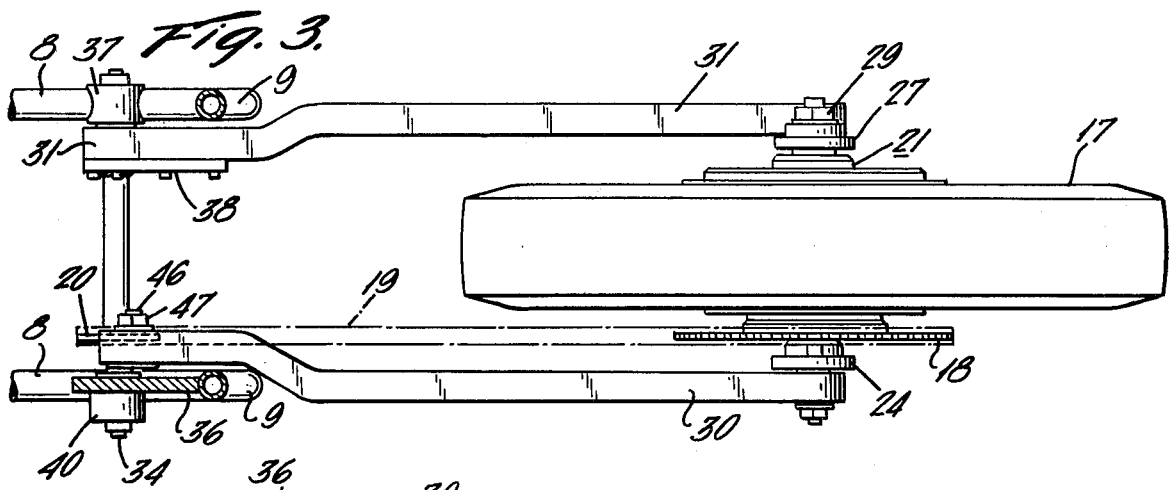
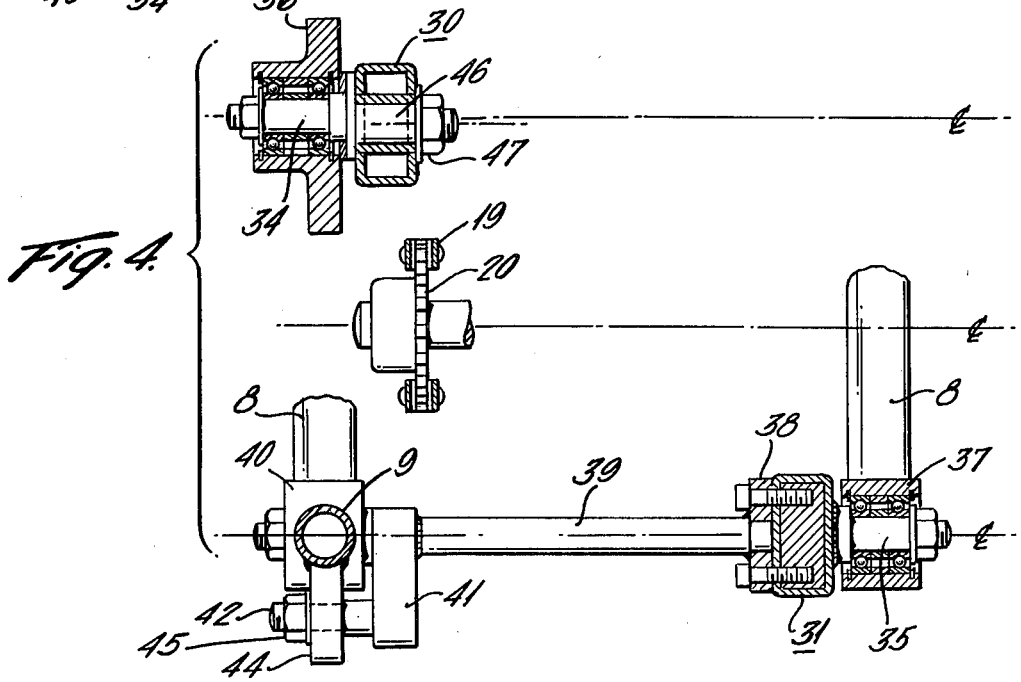
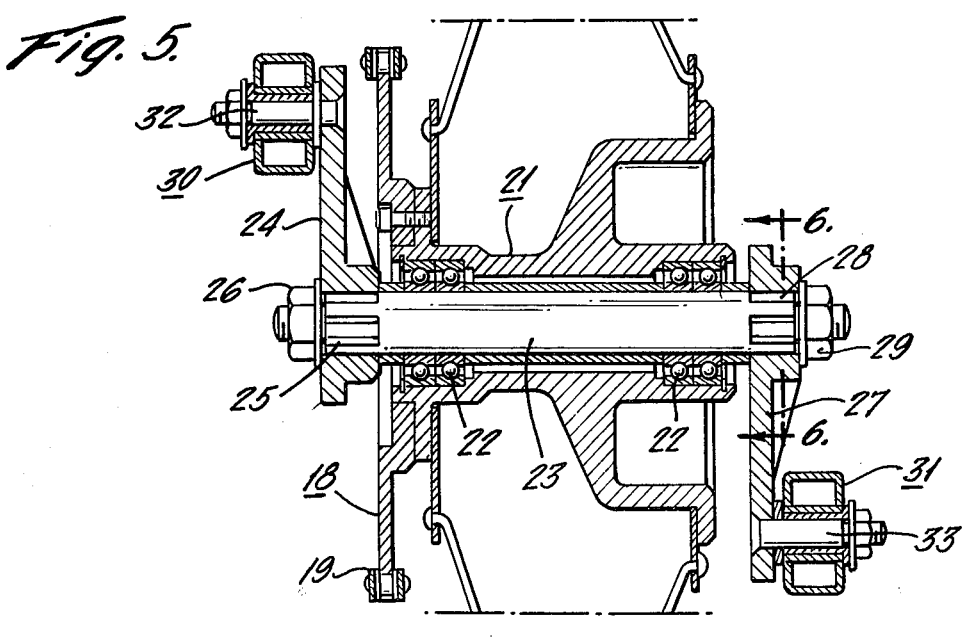

DRIVE WHEEL SUSPENSION SYSTEM FOR MOTORCYCLES

CROSS REFERENCES

The present application is a continuation-in-part of my application Ser. No. 368,220, filed Apr. 14, 1982, now U.S. Pat. No. 4,408,674.

BACKGROUND AND STATEMENT OF OBJECTS

It has been proposed to employ a parallelogram type of wheel suspension for the driving wheel of a motorcycle providing an effective swing arm axis which is coincident with the axis of the driving sprocket. One example of such a parallelogram linkage is disclosed in the Buell U.S.A. Pat. No. 4,058,181, issued Nov. 15, 1977. In said prior patent, the suspension linkage includes two pairs of swing arms or links, one pair at each side of the drive wheel, and having swing arm pivots above and below the axis of the sprocket driven by the engine. The pair of swing arms at each side of the wheel is provided with an interconnecting link with which the wheel axle structure is associated, this arrangement of parts being provided at each side of the drive wheel.

In my prior application above identified, another form of parallelogram linkage is disclosed in which the parallelogram linkage associated with the swing arms is located in a region between the periphery of the wheel and the axis of the engine sprocket, but arranged to provide an effective swing arm axis which is coincident with the axis of the engine sprocket.

The parallelogram type of linkage which has heretofore been provided in various ways, such as those referred to just above, has certain advantages in the suspension of the drive wheel of a motorcycle, including the fact that the driving chain which cooperates with the driving sprocket on the engine and the driven sprocket on the wheel has a path of substantially uniform length regardless of the degree of deflection of the driven wheel. In consequence, these parallelogram arrangements do not require any appreciable chain slack takeup when the wheel is deflected. In addition, the parallelogram linkage minimizes the torque reaction fluctuations, both with respect to the magnitude and the direction of the reaction forces delivered to the frame in different positions of deflection of the driving wheel. In this way, the torque reaction remains substantially constant for any given traction or power delivered from the wheel to the cycle frame.

The arrangement of the present invention not only provides the foregoing advantages but in addition, has additional advantages mentioned hereinafter.

In accordance with the arrangement of the present invention, the parallelogram linkage is provided in a novel manner and comprises a single swing arm at each side of the drive wheel, the arm at one side of the wheel being located at a level higher than the arm at the other side of the wheel. The ends of the swing arms at opposite sides of the wheel are interconnected through the wheel axis structure, the interconnection including an arm or lever extended upwardly from the wheel axis at one side and an arm or lever extended downwardly from the wheel axis at the other side in order to respectively cooperate with the ends of the swing arms at the opposite sides of the wheel. This swing arm interconnection provides for torsional interconnection of the arms through the axis structure. The other ends of the swing arms are pivotally mounted on portions of the frame of the motorcycle in positions on axes spaced above and below the axis of the driving sprocket.

With the arrangement just referred to, a parallelogram linkage is provided having all of the advantages hereinabove referred to but in addition, having other advantages not present in the prior arrangements. Thus, by the arrangement of the present invention, the parallelogram linkage is provided with fewer parts and much less weight than is required in the prior arrangements. This is particularly true with respect to the parts which move with the wheel, and especially because only a single swing arm need be provided at each side of the wheel.

BRIEF DESCRIPTION OF DRAWINGS

How the foregoing and other objects and advantages are attained will appear more fully from the following description referring to the accompanying drawings, in which:

FIG. 3 is a horizontal sectional view taken substantially as indicated by the section line 3—3 on FIG. 2;

FIG. 4 is an enlarged fragmentary vertical sectional view through certain parts of the linkage, the view being taken as indicated by the line 4—4 on FIG. 2;

FIG. 5 is an enlarged vertical sectional view through the drive wheel axis structure and associated parts of the linkage, taken as indicated by the line 5—5 on FIG. 2;

DETAILED DESCRIPTION OF DRAWINGS

Figure 1:
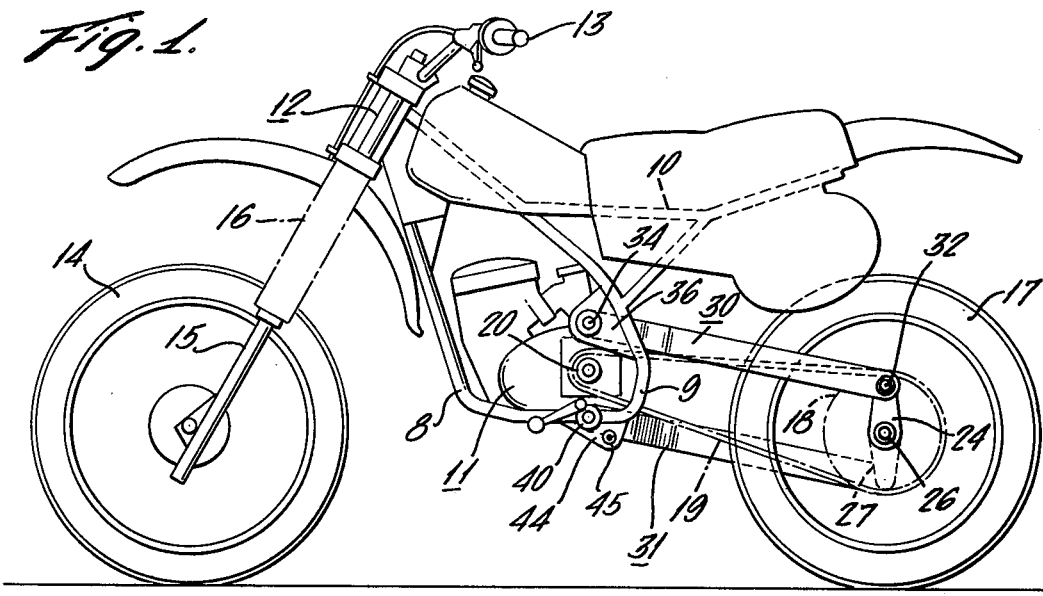
FIG. 1 is an outline side elevational view of a motorcycle having a drive wheel suspension system in accordance with the present invention.
Figure 2:
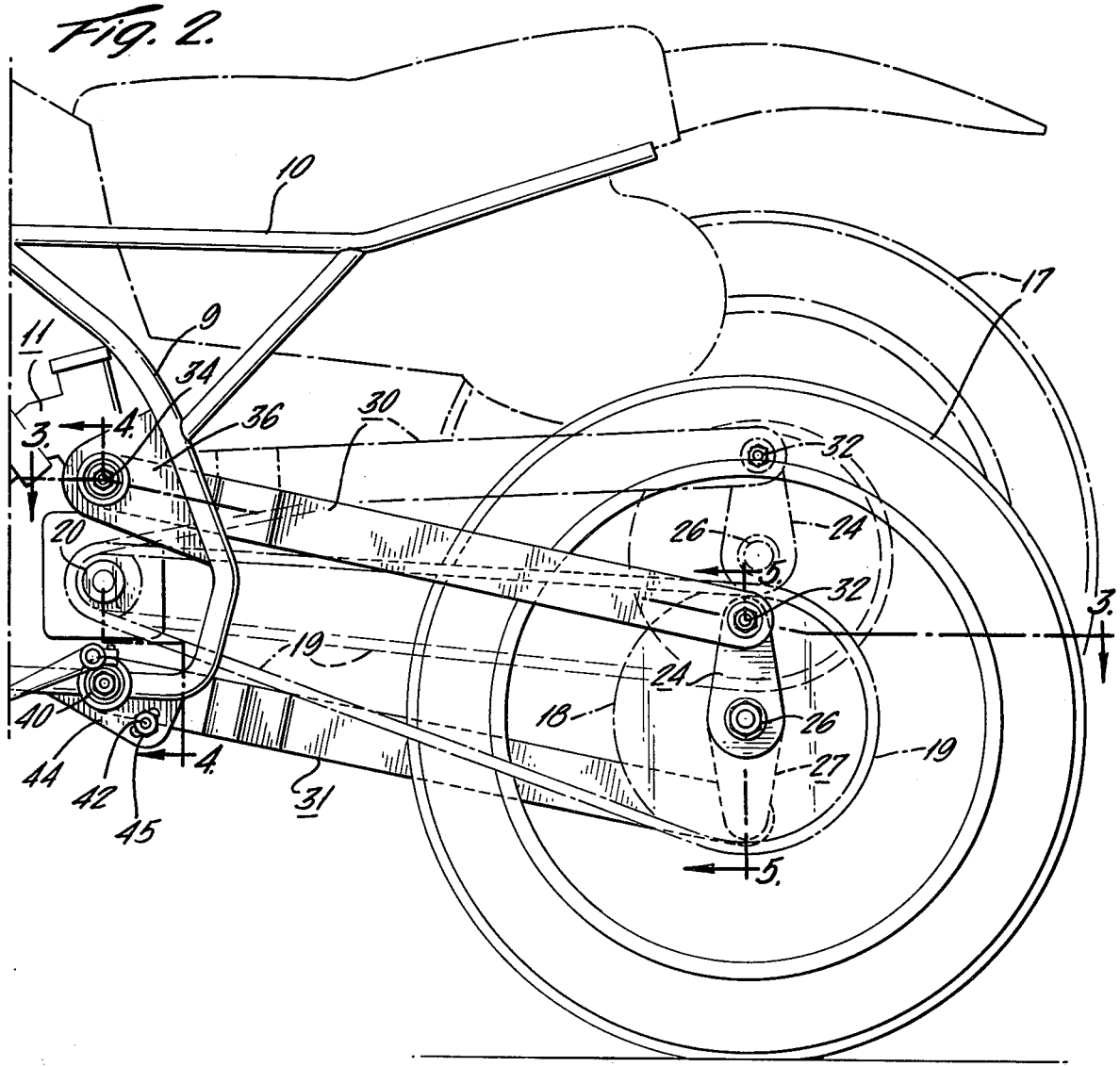
FIG. 2 is an enlarged side elevational view of the drive wheel and the associated arm and linkage parts provided according to the present invention.

In the embodiment illustrated, the frame of the motorcycle comprises interconnected framing elements, such as those indicated by the reference numerals 8, 9 and 10. The elements 8 and 9 are arranged in side-by-side pairs and are spaced from each other to accommodate the engine generally indicated at 11. These elements are connected with the steering head generally indicated at 12 with which the steering handles 13 are associated. The front wheel 14 is connected with the steering head by the fork 15 through the shock absorbers 16.

The rear or driving wheel 17 is provided with a sprocket diagrammatically indicated at 18 driven by means of the chain 19 which is driven by the driving sprocket 20 associated with the engine 11.

As is customary in motorcycles, the rear wheel 17 is mounted on suspension mechanism and associated shock-absorbing means, providing for deflection of the wheel in accordance with load fluctuations and variations in the conditions of the terrain over which the motorcycle is travelling.

In general, the drive wheel suspension mechanism ordinarily comprises a forked swing arm pivoted to the motorcycle frame and serving to mount the axis structure of the wheel. Such suspension mechanisms and swing arms take a variety of forms, and the novel suspension mechanism disclosed in the present application includes various of the parts described hereinafter with particular reference to the drawings.

As seen in FIG. 5, the rotative hub 21 of the wheel 17 is journalled by bearings 22 on a central axis structure 23 extending through the hub and projecting at opposite sides of the hub. The driving sprocket 18 is directly connected with the hub structure 21.

Figure 6:
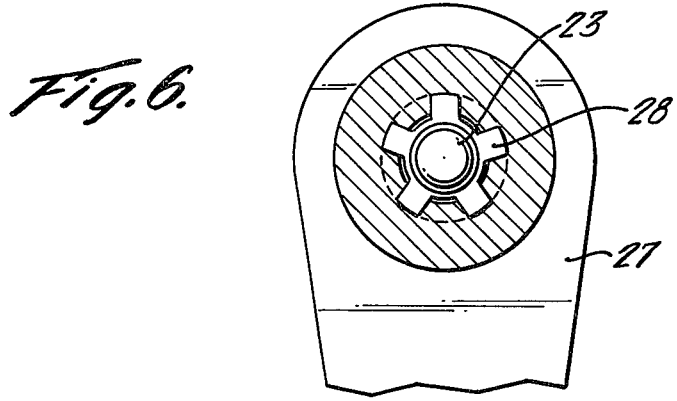
FIG. 6 is an enlarged fragmentary sectional view taken as indicated by the line 6—6 on FIG. 5.

At one side of the wheel, an upwardly extended arm 24 is provided with a spline connection 25 with the axle 23, these parts being fastened together by means of the nut 26. Similarly, at the opposite side of the wheel, an arm 27 is provided, in this case the arm being extended downwardly and being provided with a spline connection 28 (see also FIG. 6) with the adjacent end of the axle 23, these parts being fastened together by means of the nut 29.

The arms 24 and 27 are respectively pivotally connected with swing arms 30 and 31, as is indicated at 32 and 33.

Figure 7:
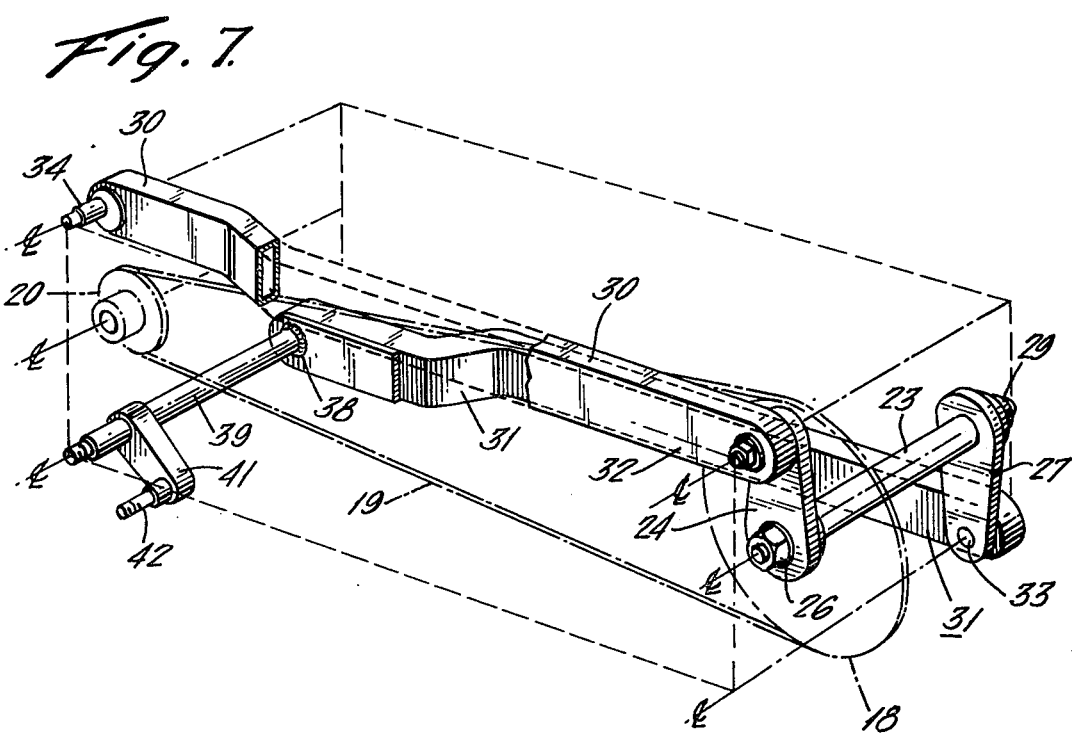
FIG. 7 is a somewhat diagrammatic perspective view of certain parts of the suspension linkage of the present application, with some dash lines applied to indicate the manner in which the parallelogram is provided by the linkage.

The two swing arms 30 and 31 are extended forwardly for pivotal connection with the motorcycle frame at pivot points indicated in FIGS. 2, 3, 4 and 7 at 34 and 35, the arrangement of these pivots being described more fully hereinafter with reference to FIGS. 3, 4 and 7. Before considering the details of the pivots 34 and 35, it is pointed out that those pivots are spaced from each other substantially the same distance as the pivots 32 and 33 provided between the swing arms and the levers 24 and 27. The axes of the pivots 32 and 33 are located substantially directly above and below the center of the axis structure of the wheel; and the axes of the pivots 34 and 35 are located substantially directly above and below the axis of the driving sprocket 20. In view of this geometry of the swing arms and the pivots as just referred to, the two swing arms provide what may be termed a "parallelogram" linkage between the wheel and the frame of the motorcycle, in consequence of which deflection of the wheel suspension mechanism does not appreciably alter the distance between the axes of the driving and driven sprockets, with various advantages mentioned more fully hereinafter.

The mounting pivot 34 for the upper swing arm 30 is associated with a bracket 36 connected with one of the frame elements 9 of the motorcycle. The mounting pivot 35 for the other swing arm is pivotally associated with the motorcycle framing as indicated at 37 but is rigidly connected at 38 with one end of the torsion bar 39, as seen in FIG. 4. The other end of the torsion bar is connected with the motorcycle frame as indicated at 40. As seen in FIGS. 4 and 7, the torsion bar 39 also carries an arm 41 carrying a stud 42 projecting through a slot 43 formed in a mounting plate 44 on the frame. The stud 42 is provided with clamping means including the nut 45 by means of which the arm 41 projecting from the torsion bar 39 and, thus, the adjoining end of the torsion bar itself may be fixed in any desired adjusted position with relation to the mounting plate 44 and, thus, the frame of the motorcycle. This provides freedom for adjustment of the neutral setting of the torsion bar 39, and permits adjustment of the resistance to deflection of the suspension linkage originating with the torsion bar 39.

In addition to the adjustability of the torsion bar 39 in order to provide for variations of the shock absorbing effect, the wheel suspension mechanism of the present invention further provides for adjustment in position of one of the swing arm pivots for the purpose of slack take-up for the driving chain.

For the slack take-up purpose, provision is made for shifting the position of the axis of the pivot 34 for the upper swing arm 30. As seen in FIGS. 4 and 7, the pivot 34 is connected with a stud or stub shaft 46 the axis of which is slightly offset from the axis of pivot 34. This stub shaft 34 is adapted to be rigidly fastened to the swing arm 30 by means of the nut 47. Since the pivot 34 and the stud 47 are rigidly interconnected, by loosening the nut 47 and rotating the stud 46 in its socket in the swing arm 30, the position of the axis of the pivot 34 with relation to the swing arm may be varied. This provides for shifting the position of the swing arm pivot axis toward and away from the wheel and thus toward and away from the driving sprocket 18 on the wheel shaft. This serves as a slack take-up adjustment for the drive chain 19. Since the suspension swing arms and associated pivots and links are arranged as diagrammatically illustrated in the perspective view of FIG. 7, in a manner establishing a "parallelogram" linkage, swing motion of the driving wheel occurs substantially about the axis of the driving sprocket 20. In consequence, the length of the drive chain path is not appreciably altered as a result of deflection of the driving wheel. Therefore, with such parallelogram linkages, only very minor slack take-up adjustment (if any) is needed; and this makes practicable the use of a slack take-up device of the kind described above, providing for a slight shift in the position of a swing arm pivot in a direction toward and away from the driving wheel.

Although, as above indicated, it has been known to employ a suspension system embodying a parallelogram linkage, certain prior art arrangements of this type, for instance as disclosed in Buell patent 4,058,181 above referred to, require the use of multiple swing arms at each side of the wheel, with extensive increase in the total weight and inertia of the parts which are movable with the wheel. Such increase in the unsprung weight is highly undesirable from the standpoint of effective and comfortable riding characteristics. According to the present invention, and particularly by virtue of torsional interconnection between single swing arms at the two sides of the wheel, it is possible to provide the parallelogram linkages by the use of a minimum total number of parts and, at the same time, with a minimum total weight and inertia.

The arrangement of the shock-absorbing torsion bar 39 as disclosed herein also simplifies structure and minimizes total weight. However, other forms of shock absorbers may alternatively be used; and such shock absorbers may include helical springs, dampers or any other devices connected with the wheel suspension linkage and providing resistance to or control of the wheel deflection movements. Such shock absorber devices may be connected with a swing arm independently of the swing arm pivot.

The suspension mechanism of the present invention is also capable of convenient connection and disconnection with respect to the driven wheel, so that the wheel may readily be removed for tire change or other purposes. The linkage at one or both sides of the wheel may readily be separated, as by removing the clamping nuts 26 and 29 and separating splined joints 25 and 28. The axle member 23 may also be readily slipped out of the wheel hub.

I claim:

1. In a motorcycle having a frame, an engine with a driving sprocket, a driven wheel having an axle structure with a coaxial sprocket chain driven from the driving sprocket, and suspension mechanism for mounting the wheel on the frame of the motorcycle, the suspension mechanism including a pair of swing arms one located at each side of the wheel, pivots for mounting the forward ends of the swing arms on the frame, one pivot being located above the driving sprocket and the other being located below the driving sprocket, and linkage interconnecting the rear ends of the swing arms, said linkage including a lever at each side of the wheel, the levers being torsionally interconnected through the axle structure and one lever extended upwardly from the axle structure and being pivotally connected with one of the swing arms and the other lever extended downwardly from the axle structure and being pivotally connected with the other of the swing arms.

2. Mechanism as defined in claim 1 in which the swing arms, frame pivots and the linkage levers with their pivotal connections with the swing arms define a parallelogram linkage.

3. Mechanism as defined in claim 1 in which the axes of said frame pivots and the axis of the driving sprocket all lie substantially in the same plane.

4. Mechanism as defined in claim 1 in which the frame pivots lie substantially in a generally upright common plane and further including means for adjusting the location of at least one of said frame pivots with respect to said common plane.

5. Mechanism as defined in claim 1 and further including a shock absorber comprising a torsion bar connected at one end with one of the swing arms and connected at the other end with the frame, the torsion bar being coincident with the axis of the frame pivot for the connected swing arm.

6. Mechanism as defined in claim 5 in which the torsion bar is mounted on the frame by pivot bearing means providing the frame pivot for the connected swing arm.

7. Mechanism as defined in claim 5 and further including torsionally adjustable means for connecting the torsion bar to the frame with freedom for torsional adjustment thereof.

8. In a motorcycle having a frame, an engine with a driving sprocket, a driven wheel having an axle structure with a coaxial sprocket chain driven from the driving sprocket, suspension mechanism for mounting the wheel on the frame of the motorcycle, the suspension mechanism including a pair of swing arms one located at each side of the wheel, and one located in a higher position than the other, pivots for mounting the forward ends of the swing arms on the frame, one pivot being located above the axis of the driving sprocket and the other being located below the axis of the driving sprocket, and linkage interconnecting the rear ends of the swing arms through the axle structure of the wheel, said linkage including a lever at each side of the wheel, the levers being torsionally interconnected through the axle structure and one lever extended upwardly from the axle structure and being pivotally connected with one of the swing arms at a distance corresponding to the distance of the frame pivot for that arm above the axis of the driving sprocket and the other lever extended downwardly from the axle structure and being connected with the other of the swing arms at a distance corresponding to the distance of the frame pivot for that arm below the axis of the driving sprocket.

9. Mechanism as defined in claim 8 and further including means for adjusting the distance between the axis of the frame pivot and the axis of the lever pivot for at least one of the swing arms.

10. In a motorcycle having a frame, an engine with a drive sprocket, a driven wheel having an axle structure with a coaxial sprocket chain driven from the driving sprocket, suspension mechanism for mounting the wheel on the frame of the motorcycle, the suspension mechanism including linkage having pivots on the frame and providing for swing motion of the wheel and driven sprocket substantially about the axis of the driving sprocket, and adjustable means associated with one of the linkage pivots on the frame and including means for fixing the position of the linkage in different positions with respect to the axis of said one linkage pivot in a direction toward and away from the wheel.

11. In a motorcycle having a frame, an engine with a driving sprocket, a driven wheel having an axle structure with a coaxial sprocket chain driven from the driving sprocket, suspension mechanism for mounting the wheel on the frame of the motorcycle, the suspension mechanism including linkage comprising a plurality of levers having pivots on the frame in positions offset from the axis of the driving sprocket, but providing for swing motion of the wheel and driven sprocket substantially about the axis of the driving sprocket, and a torsion bar connected with the linkage coaxially of a linkage pivot offset from the axis of the driving sprocket and providing shock absorption with respect to swing motion of the wheel.

12. In a motorcycle having a frame, an engine with a driving sprocket, a driven wheel having an axle structure with a coaxial sprocket chain driven from the driving sprocket, suspension mechanism for mounting the wheel on the frame of the motorcycle, the suspension mechanism including linkage including two linkage elements having pivots on the frame above and below the driving sprocket and providing for swing motion of the wheel, adjustable means for fixing the position of a linkage element in different positions with respect to the axis of its pivot on the frame in a direction toward and away from the wheel, and a torsion bar associated with the linkage coaxially of the pivot for the other linkage element and providing shock absorption with respect to swing motion of the wheel.

13. In a motorcycle having a frame, an engine with a driving sprocket, a driven wheel having an axle structure with a coaxial sprocket and with a driving chain interconnecting said sprockets, suspension mechanism for mounting the wheel for swing motion substantially about the axis of the driving sprocket the suspension mechanism including a swing arm and a lever with a mounting pivot positioned in offset relation to the axis of the sprocket in a generally upright plane containing the axis of the sprocket, and a chain slack takeup device comprising adjustable means for fixing the position of said arm in different positions with respect to the axis of said mounting pivot in a direction toward and away from the wheel.

* * * * *